INVENTOR.
William R. Williamson
BY
Murray Schaffer
ATTORNEY

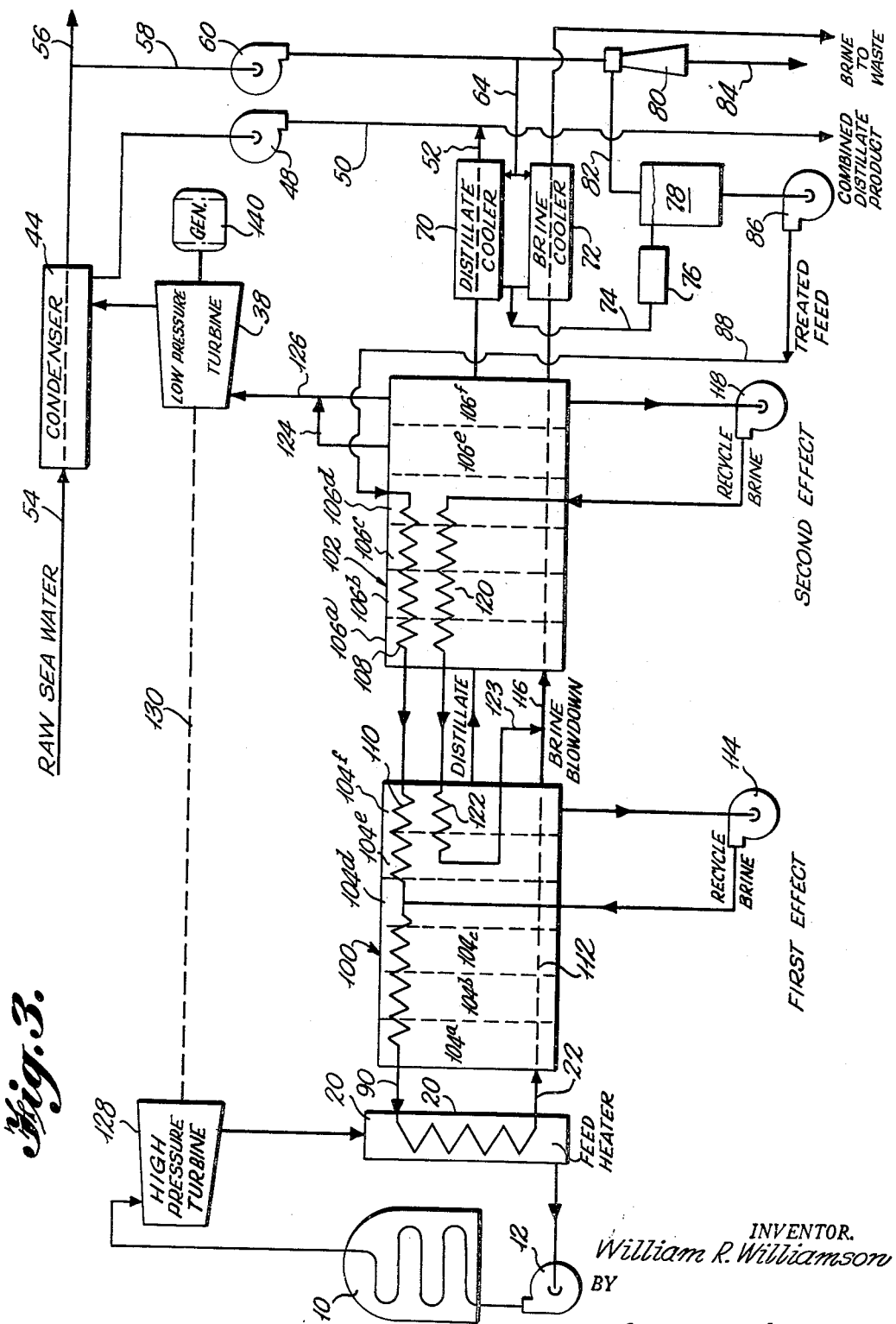

United States Patent Office 3,489,652
Patented Jan. 13, 1970

3,489,652
DESALINATION PROCESS BY MULTI-EFFECT, MULTI-STAGE FLASH DISTILLATION COMBINED WITH POWER GENERATION
William Rodger Williamson, Waterford, Conn., assignor to American Machine & Foundry Company, a corporation of New Jersey
Filed Apr. 18, 1966, Ser. No. 543,205
Int. Cl. B01d 3/06
U.S. Cl. 203—11      1 Claim

ABSTRACT OF THE DISCLOSURE

This invention covers a combined desalination and power generating method and apparatus in which heat energy from power generating means is employed in the desalination or distilling plant of a type which includes a multi-stage flash evaporator. Vapors produced in the higher stages of the evaporator are condensed to provide a fresh water distillate product; vapors produced in the lower pressure stage or stages of the evaporator are fed as steam through a low pressure turbine to drive the power means. Vapors exhausted from the low pressure turbine are condensed and comingled with the distillate product from the evaporator as part of the fresh water product.

---

This invention relates to combined distillation and power generating operations, and more particularly, it concerns a novel method and apparatus for combining sea water desalination and power generating operations.

Prior to this invention, combined desalination-power generating plants have involved using high grade energy produced by a nuclear reactor, for example, to produce steam for operating a high pressure turbine generator, the exhaust from the turbine being passed to the brine heater of a distilling plant. Where economically feasible nuclear fueled heat generators have been employed, low turbine exhaust temperatures have resulted so that the amount of heat exchange surface required in the distilling plant of such installations is objectionable, again from a cost standpoint. Although high temperature nuclear fueled heat generators are available, which would satisfy the requirements of both the power generating and distillation operations, the high capital investment costs of such high temperature heat generators has been a major deterrent to their use.

In accordance with the present invention, heat energy available from a low cost nuclear fueled heat generator is employed first in a desalination or distilling plant of the type including a multi-stage flash evaporator operating at temperatures of approximately 225° F. to 290° F. where high heat transfer rates and favorable pressure gradients are available. Vapors produced in the higher stages of the evaporator are condensed to provide a fresh water distillate product whereas vapors produced in the lower pressure stage or stages of the evaporator are fed as steam through a low pressure turbine to drive a power generator. Vapors exhausted from the low pressure steam turbine are condensed and co-mingled with the distillate product from the evaporator as the fresh water product. In large installations which justify the cost of a high temperature nuclear fueled heat generator, the low pressure turbine supplied by steam from the flash evaporator may be coupled with a high pressure turbine supplied with steam produced directly by the heat generator, the high pressure turbine exhausting to the distillation plant for operation within the temperature range aforementioned.

Among the objects of the present invention are: the provision of a combined desalination-power generating method and apparatus by which the high initial costs incident to combined desalination-power plants heretofore available are significantly reduced; the provision of a method and apparatus of the type referred to in which the amount of heat transfer surface necessary for desalinization is reduced, thereby enabling a combined plant which requires less space than plants heretofore available; the provision of a combined plant of the type referred to which lends itself to future expansion; and, the provision of a combined desalination-power generating method and apparatus by which feed treatment costs are reduced.

Other objects and further scope of applicability of the present invention will become apparent from the detailed description to follow taken in conjunction with the accompanying drawings, wherein like reference numerals designate like parts and in which:

FIG. 3 is a schematic view depicting still a further modification of this invention.

Figure 1:
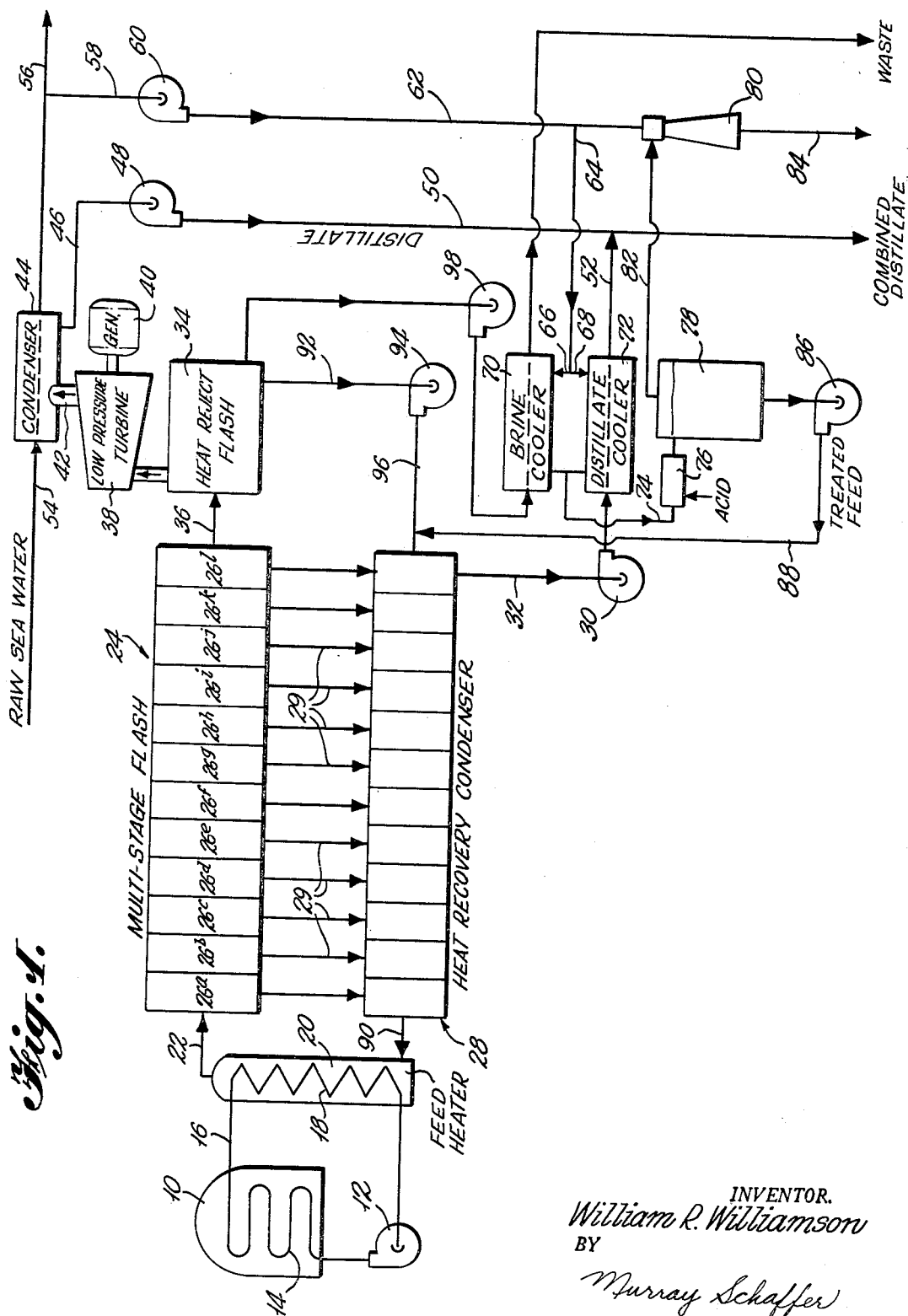
FIG. 1 is a schematic view depicting one form of the present invention.

In the embodiment illustrated in FIG. 1 of the drawings, a source of heat energy, such as a nuclear reactor 10 having a circulating pump 12 and heat exchange tubes 14, supplies heat through a conduit 16 to heat exchange coils 18 in a brine or feed solution heater 20. The solution to be distilled is fed from the heater 20 through a line 22 to a multi-stage flash evaporator generally designated by the reference numeral 24.

The multi-stage flash evaporator 24 may take a variety of structural forms, one such form being illustrated and described in U.S. Patent No. 3,186,924. It will suffice for purposes of the present description to note that the flash evaporator includes a plurality of flash chambers 26a–l which operate at successively lower pressures and temperatures proceeding from a high pressure stage 26a to a low pressure stage 26l. As the heated brine is introduced successively into the flash chambers 26, a portion thereof flashes into vapor and the vapors passed to a heat recovery condenser 28 through lines 29. The condensed vapors are removed by a pump 30 through a line 32. A relatively large heat reject flash chamber or reboiler 34 is connected to the low pressure flash chamber 26l by a line 36 to receive brine from the flash chamber 26l. Vapors produced in the heat reject flash chamber 34 are passed as low pressure steam to a turbine 38 coupled to a generator 40 to produce electric power. The exhaust from the turbine 38 is directed by way of a line 42 to a condenser 44 in which the exhaust vapors are condensed. The condensate from the condenser is drawn through a line 46 by a pump 48 and discharged to a line 50. The distillate pump 30 discharges to a line 52 which is coupled to the line 50 to discharge a combined distillate product as illustrated.

To provide the necessary coolant for the condenser 44, raw sea water, pumped through an intake line 54, is fed through the condenser and a major portion thereof discharged to waste through a line 56. A portion of the sea water in the line 56 is tapped through a line 58 and fed by a pump 60 through lines 62, 64, 66 and 68 into a brine cooler 70 and a distillate cooler 72, respectively. Preheated raw sea water is discharged from the coolers 70 and 72 by a line 74 having an acid injector 76 therein. From the line 74, the preheated feed is introduced into a deaerator 78. Entrained carbon dioxide and air are released from the feed in the deaerator 78 by a water eductor 80 through a line 82 and discharged through a line 84 along with a portion of the raw untreated sea water pumped to the line 62 by the pump 60. The treated sea water feed is pumped from the deaerator 78 by a pump 86 and fed by a line 88 to the condenser 28 of the flash evaporator 24. In accordance with well established principles of flash evaporator operation, the treated sea water feed is passed through the condenser 28 in counter-flow relation to the flow of heated brine through the flash chambers 26 and introduced to the heater 20 through a line 90.

A portion of the brine remaining in the heat reject flash chamber 34 is withdrawn as blow-down through a line 92 and recycled by a pump 94 through a line 96 where it is mixed with the fresh, treated sea water feed in the line 88 prior to its being introduced into the heat exchange tubes of the condenser 28. The remaining portion of the brine is withdrawn from the heat reject flash chamber 34 by a pump 98 and discharged through the brine cooler 70 to waste.

In the operation of the embodiment illustrated in FIG. 1 of the drawings, raw sea water at ambient temperature, after having passed through the turbine condenser 44, the brine cooler 70 and the distillate cooler 72, reaches a temperature in the line 74 of approximately 190° F. At this temperature, acid may be injected by the injector 76 to remove stoichiometrically $HCO_3$ ions to prevent scaling in the high temperature flash evaporator 24. Also, at this temperature, the low cost water power eductor 80 operates effectively to remove corrosive $CO_2$ and air from the deaerator 78. After treatment in the deaerator 78, the feed may be heated further, prior to passage into the line 96, by passage in heat exchange rotation with waste heat from the heat generator 10, or bleed steam from the turbine 38, so that its temperature approaches the temperature of the recycle brine in the line 96, usually about 225° F.

The extent to which the mixture of treated feed and brine passing to the flash evaporator 24 through the line 22 will be heated by the heater 20, in accordance with this invention, will depend on the amount of heat needed to achieve a vapor temperature in the heat reject flash chamber of approximately 225° F. Thus, the number of stages 26 and the temperature drop between stages, together with the capacity of the heater 20, will govern. With low cost nuclear fueled reactors designed to operate at a maximum of 300° F., it is contemplated that the flash plant will be designed so that where the feed in the line 22 is heated to a range of between approximately 260° F. to 290° F., steam at 225° F. will be developed in the heat reject flash chamber 34. Also, it will be appreciated that the pressure in the chamber 34 will exceed atmospheric pressure and that the flash chamber 26l operates at a higher pressure than the chamber 34. Thus, as brine from the heater 20 passes serially from the chamber 26a to the chamber 34, a portion thereof flashes into vapor in each chamber due to the pressure-temperature gradient existing between these chambers.

Figure 2:
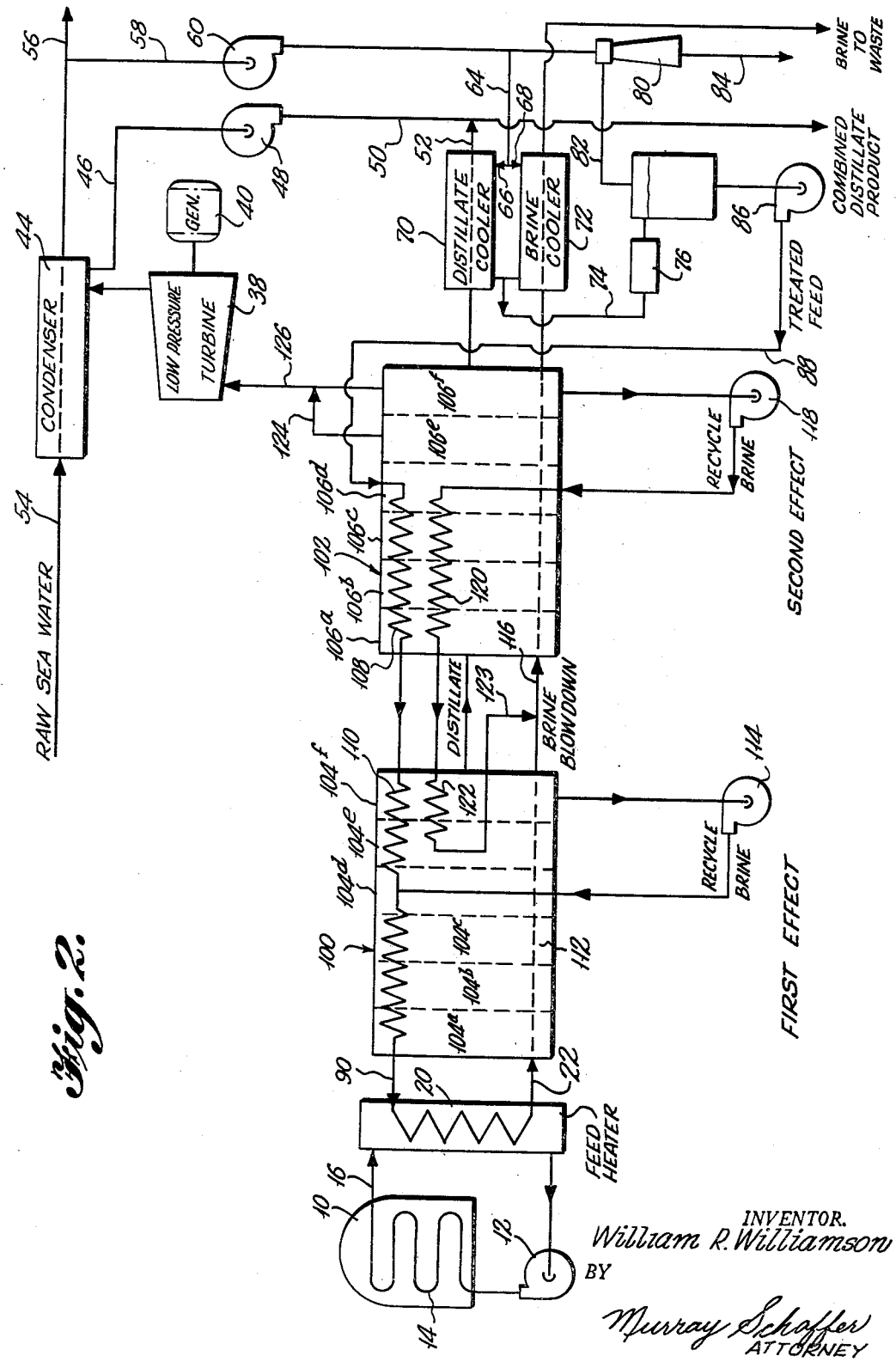
FIG. 2 is a schematic view illustrating a modified form of the present invention.

In the embodiment of FIG. 2 of the drawings, the principles of the present invention are applied to a multiple effect, multi-stage flash evaporation plant having a first effect 100 and a second effect 102. As in the embodiment of FIG. 1, each of the effects 100 and 102 include a plurality of pressure stages 104a–f and 106a–f, respectively. As shown, treated feed in the line 88 is passed through condenser tubes 108 in the higher stages 106a–d of the second effect then to the condenser tubes 110 in the first effect 100 and through the heater 20. The heated feed in the line 22 is passed through the flash chambers represented by the dashed line 112 of the first effect proceeding from the highest pressure stage 104a to the lowest pressure stage 104f of this effect. A portion of the concentrated brine is recycled from the stage 104f by a pump 114 and mixed with the treated feed in the condenser of a higher stage 104d in the embodiment shown. The remaining brine concentrate in the stage 104f is removed as blow-down through a line 116 and fed to the highest pressure stage 106a of the second effect 102. Brine recycled from the low pressure stage 106f of the second effect by a pump 118 is introduced into the condenser tubes 120 in the higher pressure stages 106a– 106d of the second effect 102 to be partially reheated and then heated further in heat exchange tubes 122 in the last two pressure stages 104e and 104f of the first effect 100. The heated recycle brine from the second effect is passed from the heat exchange tubes 120 through a line 123 and mixed with the brine blow-down from the first effect 100.

As above mentioned, the treated set water feed is introduced to the second effect 102 at the pressure stage 106d, thus leaving the lowest pressure stage 106f, as well as the next lowest pressure stage 106e, of the second effect without cooling passages so that the vapors produced in these low pressure stages may be passed as steam through lines 124 and 126 to the low pressure turbine 38. The precise number of low pressure stages in the second effect 102 left to function as reboilers or heat reject flash chambers to provide steam to the turbine will depend on the requirements of the turbine.

The embodiment illustrated in FIG. 3 of the drawings is similar in all respects to the embodiment of FIG. 2 of the drawings with the exception that in this instance, the source of heat energy 10 is significantly increased so that steam generated therein may be passed first through a high pressure turbine 128 which exhausts to the brine heater 20. The arrangement illustrated in FIG. 3 is intended for large installations where increased power requirements must be met. Hence, the high pressure turbine 128 may be coupled by means designated by the dashed line 130 to the low pressure turbine 38 to drive the generator 140.

It will be appreciated that the operation of the systems illustrated in FIGS. 2 and 3 is similar to that of the embodiment of FIG. 1. Certain advantages obtain from the systems of these latter embodiments principally because of the evaporator stages being arranged in two or more effects. For example, the amount of heat transfer surface required in multiple effect, multi-stage evaporators of the type incorporated in the embodiments of FIGS. 2 and 3 is less for a given thermal economy than it is in a single effect flash evaporator. The amount of acid and size of deaerator needed for feed treatment in such multiple effect systems are reduced. Further, additional operating temperature range is available in multiple effect evaporators, thereby providing a larger temperature differential between the stages thereof. A more complete description of multiple effect, multi-stage flash evaporators and other advantages of such installations may be found in copending application Ser. No. 440,486, filed Mar. 17, 1965, and now U.S. Patent No. 3,399,118.

It will be appreciated from the description given above, that the present invention provides a combined distillation-power generating installation by which the foregoing objectives are fulfilled. Although preferred embodiments, their operation, and their use have been disclosed, variations of these embodiments are contemplated. For example, the low pressure steam produced in the heat reject flash chamber or reboiler can also be used to energize an absorbtion type air conditioning system or for heating, laundry use or for feed heating the condensate in a very large power system. The steam could also be coupled to a low pressure distilling plant and the low pressure turbine-generator used for peaking power which would provide great flexibility in handling off-peak power.

Since further variations in the form of the present invention described herein will become apparent to those skilled in the art, it is to be distinctly understood that the foregoing description is illustrative of preferred embodiments only, not limiting, and that the true spirit and scope of the present invention is to be determined by reference to the accompanying claim.

The invention claimed is:

1. The method of simultaneously desalinating sea water into generating power comprising the steps of: heating a feed solution to temperatures on the order of 290° F.; passing the heated feed solution to the high pressure stage of a multiple effect, multi-stage flash evaporator having at least first and second effects; flash evaporating said feed solution in successive stages of said evaporator to produce a vapor fraction and a brine fraction in each stage; recycling a major portion of the brine fraction from the lowest pressure stage of said first effect and mixing it with sea water to form said feed solution; introducing the remaining portion of said brine fraction from the lowest pressure stage of said first effect to the highest pressure stage of said second effect; withdrawing a major portion of the brine fraction from the lowest pressure stage of said second effect and mixing it with said remaining brine from the lowest pressure stage of said first effect; discharging the remaining brine fraction from the low pressure stage of said second effect to waste; removing the vapor fraction from at least the lowest pressure stage of said second effect as steam at pressures exceeding atmospheric pressure; passing said steam to a low pressure turbine to generate power; and condensing the vapor fraction in the remaining stages of said first and second effects to produce a distillate product by heat exchange between said vapor fraction and said treated sea water, said recycle brine, and said feed solution.

References Cited

UNITED STATES PATENTS

| | | | |
|---|---|---|---|
| 2,636,129 | 4/1953 | Agnew | 202—234 |
| 2,759,882 | 8/1956 | Worthen et al. | 203—11 |
| 2,893,926 | 7/1959 | Worthen et al. | 203—11 |
| 3,032,482 | 5/1962 | Shoemaker | 203—100 |
| 3,076,096 | 1/1963 | Bachmann | 290—1 |
| 3,119,752 | 1/1964 | Checkovich | 202—173 |
| 3,140,986 | 7/1964 | Hubbard | 202—173 |
| 3,320,137 | 5/1967 | Jebens et al. | 202—173 |
| 2,566,732 | 9/1951 | Krieg | 60—67 |
| 3,388,045 | 6/1968 | Goeldner et al. | 202—173 |
| 3,391,062 | 7/1968 | Tidball | 202—173 |
| 3,399,118 | 8/1968 | Williamson | 202—173 |
| 3,412,558 | 11/1968 | Starmer | 202—163 |

WILBUR L. BASCOMB, JR., Primary Examiner

U.S. Cl. X.R.

60—67; 202—173, 176, 180; 203—7, 73, 78, 88